US009571344B2

(12) United States Patent
Gruber (10) Patent No.: US 9,571,344 B2
(45) Date of Patent: Feb. 14, 2017

(54) METHOD AND APPARATUS FOR TRANSMITTING PROCESS DATA IN AN AUTOMATICALLY CONTROLLED INSTALLATION

(71) Applicant: Pilz GmbH & Co. KG, Ostfildern (DE)

(72) Inventor: Winfried Gruber, Ostfildern (DE)

(73) Assignee: PILZ GMBH & CO. KG, Ostfildern (DE)

(*) Notice: Subject to any disclaimer, the term of this patent is extended or adjusted under 35 U.S.C. 154(b) by 313 days.

(21) Appl. No.: 14/510,540

(22) Filed: Oct. 9, 2014

(65) Prior Publication Data

US 2015/0023178 A1 Jan. 22, 2015

Related U.S. Application Data

(63) Continuation of application No. PCT/EP2013/057378, filed on Apr. 9, 2013.

(30) Foreign Application Priority Data

Apr. 13, 2012 (DE) .................. 10 2012 103 194

(51) Int. Cl.
*H04L 12/24* (2006.01)
*H04L 12/40* (2006.01)
(Continued)

(52) U.S. Cl.
CPC .......... *H04L 41/0866* (2013.01); *H04B 1/16* (2013.01); *H04L 12/40* (2013.01); *H04L 43/08* (2013.01);
(Continued)

(58) Field of Classification Search
CPC ...... H04L 41/0866; H04L 12/40; H04L 43/08; H04L 2012/4026; H04B 1/16
See application file for complete search history.

(56) References Cited

U.S. PATENT DOCUMENTS 7,864,884 B2 * 1/2011 Jansen ................ H04L 27/2655
370/343
2010/0219992 A1 9/2010 Rohatschek
(Continued)

FOREIGN PATENT DOCUMENTS

EP 0814586 A2 12/1997
EP 1009125 A2 6/2000
(Continued)

OTHER PUBLICATIONS

EN ISO 13849-1; Safety of machinery—Safety-related parts of control systems—Part 1: General principles for design; Nov. 2006; 97 pp.
(Continued)

*Primary Examiner* — Ian N Moore
*Assistant Examiner* — Latresa McCallum
(74) *Attorney, Agent, or Firm* — Harness, Dickey & Pierce, P.L.C.

(57) ABSTRACT

A process data transmitter transmits process data at defined recurring time intervals as a serial transmit data stream including data symbols at a defined symbol rate. A process data receiver samples the serial transmit data stream at a sampling rate which is higher than the symbol rate by a defined factor to thereby generate a serial receiver data stream having a plurality of sampling values per data symbol. The process data receiver subdivides the serial receiver data stream into data packets, each of which has a defined first number of sampling values. The process data receiver selects a defined second number of sampling values from the respective data packets. The second number is smaller than the first number by the defined factor and the sampling values selected from each data packet are equidistant from one another. The process data receiver processes the selected sampling values as received process data.

17 Claims, 8 Drawing Sheets

(51) Int. Cl.
*H04B 1/16* (2006.01)
*H04L 12/26* (2006.01)

(52) U.S. Cl.
CPC ........ *H04L 2012/4026* (2013.01); *Y02P 90/14* (2015.11)

(56) References Cited

U.S. PATENT DOCUMENTS

2011/0169540 A1   7/2011   Kyles et al.
2012/0008723 A1   1/2012   Stojanovic

FOREIGN PATENT DOCUMENTS

WO   WO-2004097539 A1   11/2004
WO   WO-2006069691 A1   7/2006
WO   WO 2009/030278 A1   3/2009

OTHER PUBLICATIONS

CEI IEC 61508-2; Functional safety of electrical/electronic/programmable electronic safety-related systems—Part 2: Requirements for electrical/electronic/programmable electronic safety-related systems; May 2000; 152 pp.
Yih-Horng Lin et al; A Pipelined Serial Data Receiver with Oversampling Techniques for High-Speed Data Communications; 2003; pp. 167-170.
ISA/EP; English translation of International Preliminary Report on Patentability (Chapter 1); issued Oct. 14, 2014; 10 pp.

\* cited by examiner

METHOD AND APPARATUS FOR TRANSMITTING PROCESS DATA IN AN AUTOMATICALLY CONTROLLED INSTALLATION

CROSS-REFERENCES TO RELATED APPLICATIONS

This application is a continuation of international patent application PCT/EP2013/057378 filed on Apr. 9, 2013 designating the U.S., which international patent application has been published in German language and claims priority from German patent application DE 10 2012 103 194.0 filed on Apr. 13, 2012. The entire contents of these priority applications are incorporated herein by reference.

BACKGROUND OF THE INVENTION

The present invention relates to a method and apparatus for transmitting process data in an automatically controlled installation and a corresponding process data receiver designed to receive process data according to the method.

WO 2004/097539 A1 describes a method and a device for controlling a safety-critical process in which a failsafe operation is required in order to avoid a risk to persons. In particular, it involves the monitoring and control of installations operating in an automated manner, the operation of which presents a risk of injury to persons. An installation of this type is usually safeguarded by protective fencing, protective doors, light barriers, light grids, emergency switches and other safety sensors. As soon as a protective door is opened, a light barrier is interrupted or an emergency switch is actuated, the installation must be stopped or transferred into a safe condition in a different manner. This is normally achieved by a controller of failsafe design evaluating state signals of the protective doors, light grids, emergency switches, etc., at defined recurring time intervals and by triggering safety-related actuators depending thereon, such as, for example, contactors, which are disposed in the power supply path to the electric drives of the installation.

The sensors and actuators are often physically distanced from the controller. In a large-scale installation with many sensors and actuators, it is appropriate to connect the controller to the sensors and actuators via a bus system. The bus system enables the exchange of digital data which represent the states of the sensors and actuators, and also control commands of the controller. These data are referred to below generally as process data. In addition, process data can contain diagnostic information and/or configuration information which is important for the operation of the installation.

Aforementioned WO 2004/097539 A1 describes a method and a corresponding device, wherein a plurality of I/O units transmit process data via a bus system to a control unit. The control unit generates a variable keyword with which the I/O units encode the process data to be transmitted. Due to the changing coding, the transmitted data change, even if the process data as such remain the same over a long period of time, e.g. because the state of a protective door does not change. A defined dynamic behavior is created using the variable keyword, enabling the controller to check the I/O units for failsafe operation. The method and the corresponding device have proven successful in practical operation. Nevertheless, the wish exists to further optimize the transmission of process data in an installation controlled in an automated manner. In particular, the wish exists to increase the data transmission speed in order to transmit as much process data as possible in the shortest possible time intervals via a bus system that is simple and economical to implement.

WO 2006/069691A1 describes a further control system with physically distributed stations between which process data are transmitted at recurring time intervals. A first station produces a data frame with a plurality of data fields. The data frame is transmitted in the manner of a bucket brigade by a series of further stations. Each further station writes process data into the data frame and reads process data from other stations when the data frame filled by all stations is transmitted back again by the series of stations to the first station. This method makes it possible to implement a cross-communication between any stations of a control system within a single communication cycle.

The two aforementioned documents describe methods for transmitting process data in automatically controlled installations in a higher protocol layer of the OSI reference model. To put it more precisely, this involves rules according to which the communication proceeds. The electrical or optical signals with which the process data are transmitted is of secondary importance for the proposed methods. In particular, it is irrelevant for the proposed methods whether the process data are transmitted using separate data and clock lines or whether the process data and the transmission clock are combined in one signal. The clock signal determines the transmission speed and a combination in one signal is desirable in order to minimize the number of transmission lines.

Methods already exist in the prior art which make it possible to combine a clock signal and data in one common signal. These methods typically require a PLL on the data receiver side. The PLL (Phase Locked Loop) is a control circuit which generates a clock signal which synchronizes itself with an externally fed signal. A clock signal can thus be generated from a data stream using a PLL, said clock signal then enabling an unambiguous reconstruction of the individual data symbols of the data stream. Unfortunately, a PLL is fairly complex and costly if a large number of relatively simple and economical process data receivers are to be implemented.

Alternatively, the possibility exists for reconstructing data symbols from a serial data stream using oversampling. In this case, the data receiver must process the received data stream at a clock frequency that is substantially higher than the symbol rate of the data stream itself. This is problematic if the symbol rate of the data stream and accordingly the data transmission speed are intended to be high, since very fast and correspondingly costly circuits are then required on the receiver side. The oversampling is therefore typically used only for relatively slow data transmissions, such as, for example, in the known RS-232 data transmission from the 1960s. An oversampling in an RS-232 data transmission is described, for example, in an Application Note with the number 2141 from Maxim Integrated Products, based in Sunnyvale, Calif., USA.

SUMMARY OF THE INVENTION

Against this background, it is an object of the present invention to provide a method for transmitting process data in an automatically controlled installation which method enables a very economical implementation in conjunction with a high data transmission speed. Due to the desired use, it is another object to enable a serial transmission of a high amount of process data at cyclically recurring time intervals in a cost-efficient manner. A further object is to provide an economical process data receiver which is suitable for receiving cyclically recurring process data in an automatically controlled installation.

According to a first aspect of the invention, there is provided a method for transmitting process data in an automatically controlled installation, the method comprising the steps of: providing a process data transmitter which transmits respective current process data via a data line at defined recurring time intervals, and providing a process data receiver which receives the process data via the data line, wherein the process data transmitter transmits the process data via the data line in the form of a serial transmit data stream comprising a plurality of data symbols at a defined symbol rate, wherein the process data receiver samples the serial transmit data stream at a sampling rate which is higher than the symbol rate by a defined factor in order to thereby generate a serial receiver data stream comprising a plurality of sampling values per data symbol, wherein the process data receiver subdivides the serial receiver data stream into data packets, each of which has a defined first number of sampling values, wherein the process data receiver selects a defined second number of sampling values from the respective data packets, wherein the second number is smaller than the first number by the defined factor, wherein the sampling values selected from each data packet are equidistant from one another, and wherein the process data receiver processes the selected sampling values as received process data.

According to a further aspect, there is provided in an automatically controlled installation in which a process data transmitter transmits respective current process data at defined recurring time intervals via a data line, wherein the process data transmitter transmits the process data via the data line in the form of a serial transmit data stream which has a plurality of data symbols at a defined symbol rate, a process data receiver for receiving the process data, comprising an input for receiving the serial transmit data stream, comprising a communication module which extracts the process data from the serial transmit data stream, and comprising an output, wherein the communication module samples the serial transmit data stream at a sampling rate which is higher than the symbol rate by a defined factor in order to thereby generate a serial receiver data stream with a plurality of sampling values per data symbol, wherein the communication module subdivides the serial receiver data stream into data packets, each of which has a defined first number of sampling values, wherein the communication module selects a defined second number of sampling values from the respective data packets, wherein the second number is less than the first number by the defined factor, wherein the sampling values selected from each data packet are equidistant from one another, and wherein the communication module makes the selected sampling values available at the output.

The novel method and process data receiver operate according to the oversampling principle, i.e. the transmit data stream is sampled at a sampling rate which supplies a plurality of sampling values for each data symbol. The communication module integrated into the process data receiver then selects one sampling value per data symbol from the plurality of sampling values per data symbol. The process data receiver thus reconstructs the process data from the transmit data stream without requiring a clock signal which is synchronized with the symbol rate of the transmit data stream and/or the clock signal of the process data transmitter. The novel method and the corresponding process data receiver therefore do not require a PLL, which enables an economical implementation.

Due to the lack of a synchronized clock signal, the selection of the "correct" sampling values for each data symbol from the overall set of available sampling values is a challenge. According to the novel method, the selection is carried out block-by-block or group-by-group in that the process data receiver subdivides the receiver data stream into data packets and then selects the suitable sampling values block-by-block or group-by-group from the data packets. This makes it possible to implement the selection of the suitable or correct sampling values with data paths parallel to one another. Due to the parallelization, the many sampling values per data symbol can be evaluated simultaneously without the process data receiver having to operate at a clock frequency which is a multiple of the symbol rate. The novel method therefore enables a particularly economical implementation which does neither require a PLL nor "superfast" modules.

One criterion for selecting the correct sampling values is that the selected sampling values for each data packet are equidistant from one another. This means that the time interval between one selected sampling value and the next selected sampling value within the respective data packet considered is exactly the same. However, the time intervals between two selected sampling values may fluctuate from one data packet to another, which is advantageous for equalizing speed fluctuations in the transmit data stream and/or a different clock basis between the transmitter and receiver.

A further criterion for the selection relates to the number of sampling values selected from a data packet. This (second) number is smaller by the same factor by which the (first) number of sampling values is higher than the number of data symbols in the transmit data stream. Consequently, the novel method supplies exactly one sampling value per data symbol. Through the block-by-block selection in conjunction with the condition that the selected sampling values are equidistant from one another, the respectively "correct" sampling values can be determined economically and with a high accuracy. In particular, the block-by-block selection enables a data processing which can be implemented despite the oversampling at the lower clock frequency of the transmit data stream. The above-mentioned object is therefore completely achieved.

In a preferred refinement of the invention, the process data receiver selects the defined second number of sampling values simultaneously from the respective data packets.

In principle, it is conceivable to carry out the selection of the suitable sampling values block-by-block using the data packets, but to determine the selected sampling values in each block in temporal succession in that, for example, a logic path which implements the selection is passed through again, and therefore multiple times, for each selected sampling value. However, a simultaneous selection using parallel data paths is preferred, since it enables a faster reconstruction of the process data with lower-cost components. In this design, the block-by-block processing of the numerous sampling values per data symbol is therefore used not only as a criterion for selecting the suitable sampling values, but the selection itself is parallelized and preferably distributed among exactly as many data paths as the sampling values that must be selected per data packet. In a particularly preferred exemplary embodiment, which will be explained in detail below, the transmit data stream is quadruply oversampled so that four sampling values are present for each data symbol. Twenty sampling values with five data paths parallel to one another are then processed for each data packet, so that five sampling values are selected simultaneously from the twenty sampling values. Each selected sampling value represents a data symbol in the transmit data stream. The number of data paths parallel to one another and therefore also the number of simultaneously selected sampling values is therefore higher in such cases than the factor by which the sampling rate itself is higher than the symbol rate. A parallelization of this type makes it particularly simple to operate each data path at a clock frequency which matches or is even less than the symbol rate of the transmit data stream.

In a further refinement, the process data receiver forms the data packets in temporally successive steps. Preferably, the process data receiver forms a respective data packet for each "block selection", wherein a sampling value for one of at least three data symbols is selected from each respective data packet. Furthermore, it is preferred if the process data receiver writes the sampling values resulting from the oversampling into a shift register from which the defined first number of sampling values is read out in parallel in order to subdivide the serial receiver data stream into the data packets.

In this refinement, the entire transmit data stream is not analyzed "en bloc" in order to reconstruct the transmitted process data at the receiver side, but rather the process data receiver uses the subdivision of the receiver data stream into data packets for a sequential processing. However, a parallel processing takes place for each data packet in the preferred cases in order to achieve the advantages explained above. This refinement enables a reconstruction of the process data "on the fly", i.e. the reconstruction of the process data can already begin before the process data receiver has completely received the transmit data stream. This design is particularly advantageous if the transmit data stream passes successively through a plurality of stations, wherein each station individually reads out allocated information from the transmit data stream and/or inserts current process data into the transmit data stream. The refinement is therefore particularly suitable for applications in which a central control unit "gathers" process data from a plurality of sensors and actuators in order to determine control commands for the actuators in dependence thereon.

In a further refinement, each selected sampling value has a right-side and left-side neighbor, wherein the process data receiver compares the selected sampling values with their respective right-side and left-side neighbors in order to determine a plurality of comparison results.

The comparison results of this refinement represent the neighboring relationships between the selected sampling values and their respective neighbors. Using these neighboring relationships, it is simple to establish whether the selected sampling values are located predominantly in the center of the data symbols which they represent in each case, or whether the selected sampling values are instead located on the edge and in particular in the area of the signal edge of an associated data symbol. The latter is unfavorable as it carries the risk that the sampling value incorrectly represents the information in the associated data symbol. In other words, it is preferred if the selected sampling values each are predominantly located in the center of the corresponding data symbols which they represent. A comparison of the selected sampling value with its right-side and left-side neighbors, i.e. with non-selected sampling values which immediately precede or immediately follow the selected sampling value in time, enables a very simple and quickly implementable check of the selected sampling values. For the preferred case in which the data symbols are binary symbols, a simple identity comparison suffices in order to establish whether a selected sampling value has been "well" selected. If the selected sampling value is equal to its neighboring sampling values, the selected sampling value cannot be located on a signal edge in the transmit data stream. However, if one of the neighbors has a level value other than the selected sampling value, the selected sampling value is located on a signal edge of the transmit data stream. In this case, it is advantageous at least to carry out the selection of the next sampling values in such a way that the distance to the signal edge is increased. In addition, the selected sampling value can be subjected to a plausibility check in order to avoid errors in the reconstruction of the process data.

In a preferred exemplary embodiment, in which the data symbols are binary data symbols, the selected sampling value is linked using an XOR comparison with its right-side neighbor and using a further XOR comparison with its left-side neighbor. If the XOR link results correspond to a logical 0, the selected sampling value and its corresponding neighboring value are equal. A logical 1, on the other hand, indicates that the selected sampling value and its neighbor are different from one another. An XOR link therefore very simply and quickly enables a check on whether the selected sampling value is "suitable".

In a further refinement, the process data receiver forms the data packets depending on the comparison results. Each new data packet is preferably formed depending on the comparison results which the selected sampling values supply from the temporally preceding data packet. As a result of this refinement, the boundaries of the data packets vary depending on the time interval between the selected sampling values and signal edges of the transmit data stream. The selection of the sampling values adaptively adjusts itself to the current transmit data stream. As a consequence, sampling values may be contained in duplicate in two consecutive data packets or individual sampling values may not be contained in any data packet and accordingly are not available at all for selection.

In a further refinement, the process data receiver selects the second number of sampling values depending on the comparison results.

In this refinement, the process data receiver virtually forms a mask with equidistant holes, wherein the mask is laid over the sampling values available for selection depending on the comparison results. The position of the mask in relation to the sampling values depends on the comparison results. This design helps the selection of the suitable sampling values to adapt very quickly to the currently received transmit data stream.

In a further refinement, the process data receiver selects first equidistant sampling values from a first data packet, and selects second equidistant sampling values from a second data packet, wherein the first and second sampling values are equidistantly distributed from one another overall if the first sampling values and their respective right-side and left-side neighbors are in each case equal.

In this refinement, the process data receiver retains a "mask position," with which it has selected the first sampling values from the first data packet, also for the selection of the second sampling values from the subsequent second data packet, as long as the comparison results contain no indication that selected sampling values are located in the area of a signal edge of the transmit data stream. Consequently, the selected sampling values are equidistantly distributed over a plurality of data packets. The design enables a very simple and fast selection of suitable sampling values.

In a further refinement, the second sampling values are shifted in relation to the first sampling values if at least one first sampling value is not equal to its right-side or left-side neighbor.

In this refinement, the process data receiver changes the mask position for the selection of the second sampling values from the second data packet if at least one sampling value from the first data packet is located in the area of the signal edge of the transmit data stream. With this design, the process data receiver responds very quickly to an unfavorable selection of sampling values. Errors in the reconstruction of the process data receiver are minimized accordingly.

In a further refinement, the process data transmitter transmits the current process data with a line code, in particular a 4B5B line code, which is designed in such a way that at least one symbol change occurs in each data packet.

A line code defines how the transmit data stream is transmitted on the physical layer, i.e. on the lowest layer of the OSI reference model. The novel method and the novel process data receiver preferably use a binary line code in which two different signal states represent the logical states 0 and 1. In principle, however, the novel method and the corresponding process data receiver can also be implemented with a higher-value line code, such as a ternary line code. In any case, it is advantageous if the line code contains signal changes even if the logical states of the process data to be transmitted do not change over a lengthy period, for example because sensors of the installation have a non-actuated state (=logical 0) over a long period. If the length of the data packets is selected so that at least one symbol change occurs in each data packet, it can be ensured, with the comparison of the selected sampling values with their respective neighbors described above, that the selected sampling values are suitable for reconstructing the transmitted process data without errors. In the preferred variants, the refinement therefore includes the use of a line code which generates symbol changes even for long logical 0 or 1 sequences, wherein the length of the data packets is selected so that at least one symbol change occurs in each data packet.

In a further refinement, the factor is equal to 4 and the second number is preferably equal to 5.

A 4B5B line code transmits five binary data symbols which together represent respective four binary useful data bits. The 4B5B line code therefore inserts redundancy bits into the transmit data stream, thus enabling an error correction or at least an error detection. In addition, the 4B5B code ensures that a symbol change occurs at least after four equal data symbols. The 4B5B line code is therefore very well-suited to a low-cost implementation of the novel method. If the oversampling factor is then also selected as equal to 4, and the second number, i.e. the number of selected sampling values from each data packet, is equal to 5, each data packet supplies five bits, from which the four useful data bits of the transmit data stream can very simply and quickly be reconstructed.

In a further refinement, the process data receiver generates a first and a second clock signal which are phase-shifted by 90° in relation to one another, wherein the process data receiver samples the transmit data stream with each individual edge of the first and the second clock signal.

This refinement very simply and economically enables a quadruple oversampling of the transmit data stream, wherein the process data receiver requires only two phase-shifted clock signals, the clock frequency of which matches the symbol rate of the transmit data stream. In a preferred exemplary embodiment, the clock frequency of the first and second clock signals is above 100 MHz, in particular 125 MHz. In this case, the sampling rate for a quadruple sampling is 500 MHz.

In a further refinement, the process data receiver has a logic array with a plurality of data paths parallel to one another, wherein the parallel data paths operate at a clock frequency which corresponds to the defined symbol rate. In the aforementioned exemplary embodiment, the symbol rate is 125 MHz and, accordingly, the parallel data paths each operate at 125 MHz. The novel method enables the process data to be reconstructed with a quadruple oversampling without the data paths used for the data reconstruction having to operate at a high clock frequency of 500 MHz.

In a further refinement, the process data receiver modifies defined process data from the serial data stream in order to generate an updated transmit data stream, and the process data receiver transmits the updated transmit data stream via a further data line. The process data receiver preferably transmits the updated transmit data frame on-the-fly, i.e. it transmits the updated transmit data stream already at a time during which it still receives the transmit data stream of a different process data transmitter.

This refinement makes highly advantageous use of the novel method, since it enables the "gathering" of process data from a plurality of stations which are arranged in a logical sequence within an installation. Each station can insert "its" transmit data into a circulating data stream transmitted from station to station. The design combines the advantages of the novel method in an optimum manner with the requirements arising during the transmission of process data in an automatically controlled installation.

It goes without saying that the features described above and those still to be explained below are usable not only in the respectively indicated combination, but also in other combinations or in isolation without exceeding the scope of the present invention.

BRIEF DESCRIPTION OF THE DRAWINGS

Exemplary embodiments of the invention are shown in the drawing and are explained in detail in the following description, wherein.

DESCRIPTION OF PREFERRED EMBODIMENTS

Figure 1:
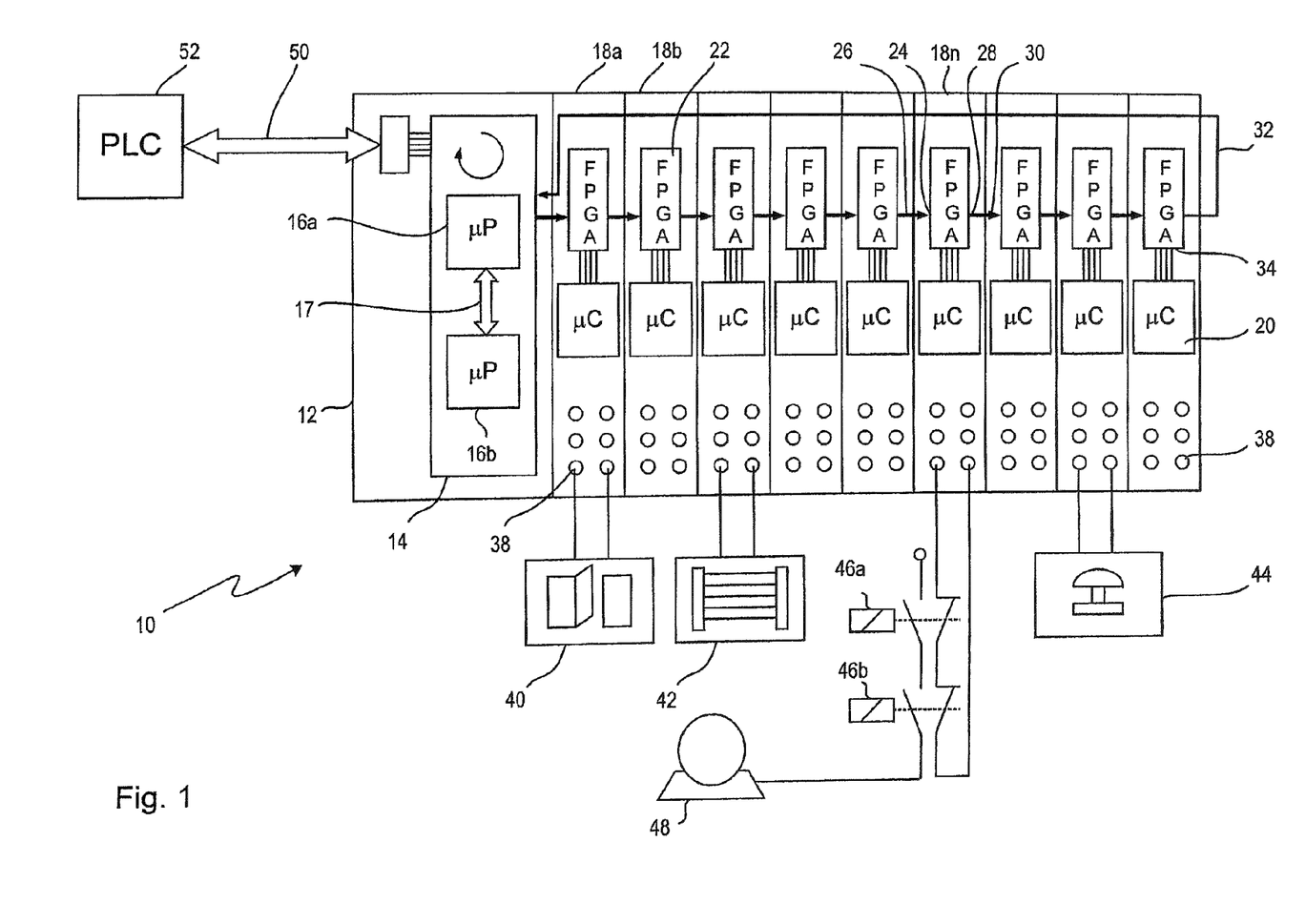
FIG. 1 shows a simplified representation of a modular controller for the safety-related control of an automated installation, wherein an exemplary embodiment of the novel method and the novel process data receiver are used.

FIG. 1 shows a device in which an exemplary embodiment of the novel method and the novel process data receiver is used, denoted in its entirety by reference number 10.

In this case, device 10 is a modular controller which is designed to control a technical installation in an automated manner. For example, the technical installation may be a production line of an automobile manufacturer, a conveyor belt at an airport or a different installation, the operation of which presents a hazard to persons in the surrounding area of the installation. In the preferred exemplary embodiments, the controller is able to control safety-related functions and standard functions. The latter are functions relating to the normal operating process of the installation. The former are functions which serve above all to avoid accidents and injuries through the operation of the installation. In principle, the novel method and the corresponding process data receiver can, however, be used in other controllers also, in particular controllers which exclusively control normal operating functions of an installation, or in pure safety controllers which exclusively control safety functions.

Here, the controller 10 has a head part 12 which in this case comprises a failsafe evaluation and control unit 14. In the preferred exemplary embodiments, the evaluation and control unit 14 has at least two processors 16a, 16b which execute a control program redundantly in relation to one another and which mutually monitor one another. This is shown in FIG. 1 in simplified form by a double arrow 17. Failsafe means here that the head part 12 meets at least the requirements according to SIL 2 of the international standard IEC 61508 and/or the PL d requirements according to the standard EN ISO 13849-1 or comparable requirements.

The controller 10 furthermore comprises a series of I/O units 18a, 18b, ... 18n .... The I/O units 18 serve to receive and output signals with which the controller 10 influences the operation of the installation. In one preferred exemplary embodiment, the I/O units are electrically and mechanically connected to the head part 12, as shown in simplified form in FIG. 1. In other exemplary embodiments, it is possible for the I/O units to be disposed separately from the head part 12 or separately from a controller corresponding to the head part 12 and to communicate with the head part 12 merely via a communication connection which is explained in detail below.

In the present exemplary embodiment, each I/O unit 18 has a control module 20 which is implemented, for example, using a microcontroller. Instead of a microcontroller, the control module 20 can also be implemented as an ASIC, as an FPGA, using more powerful microprocessors or with comparable logic modules.

Furthermore, each I/O unit 18 has a communication module 22 which is implemented in preferred exemplary embodiments as an FPGA. In principle, it is possible for the communication module 22 and the control module 20 to be integrated into a common communication and control module and/or for the function of the communication module 22 to be performed by suitable programming of a microcontroller.

The communication module 22 has an input 24 to which a first data line 26 is connected, and an output 28 to which a second data line 30 is connected (shown in FIG. 1 using the example of the I/O unit 18n). In the preferred exemplary embodiment, the first data line 26 and the second data line 30 together form a serial data line which is routed through all communication modules 22 of the I/O units 18. In the exemplary embodiment shown, the serial data line connects the I/O units 18 to the head part 12. From the last communication module 22 in the series, a further data line 32 is fed back to the evaluation and control unit 14 of the head part 12 so that a loop is formed overall via which the evaluation and control unit 14 of the head part 12 can communicate with the I/O units 18. In this preferred exemplary embodiment, each I/O unit 18 is both a process data receiver and a process data transmitter, since each communication module 22 receives process data of a preceding communication module 22 at its input 24 and transmits process data—modified if necessary—at its output 28. The same applies here to the evaluation and control unit 14 which may in principle contain the same FPGA as the I/O units (not shown here).

The novel method is not restricted to the loop shown here. It can like-wise be used with other topologies, for example with a simple point-to-point connection, in a star topology or in a tree topology. However, the method is suitable in particular for the line and/or loop topology shown.

Here, each communication module 22 has a further output 34 to which the communication module 22 supplies process data for the control module 20. The output 34 may be a register or storage area or a logical data transfer point in a process program if the communication module 22 is integrated into the control module 20.

Conversely, the communication module 22 can receive process data from the control module 20 and integrate it into the serial data stream which is transmitted via the output 28 to the next following communication module. The output 34 may accordingly be a two-way input and output interface.

Each I/O unit 18 has a plurality of connections 38 to which sensors and/or actuators can be connected. A protective door switch 40, a light grid 42, an emergency-off button 44 and two contactors 46a, 46b are shown as examples here. Using the contactors 46a, 46b, the controller 10 can interrupt the power supply to an electric motor 48 if, for example, the protective door sensor 40 indicates that a protective door has been opened.

The sensors 40, 42, 44 and actuators 46, 48 are shown here by way of example. In practice, further sensors and/or actuators may be connected to the controller 10, such as rotational speed sensors, temperature sensors, position sensors or magnetic valves.

The evaluation and control unit 14 gathers process data in each case representing a current state of the sensors and actuators via the I/O units 18 at—preferably cyclically—recurring time intervals. The evaluation and control unit 14 then processes the gathered process data and, depending thereon, generates further process data which are transmitted to the control modules 20 of the I/O units 18. The further process data may, for example, contain a control command which causes the power supply for the motor 48 to be interrupted by means of the contactors 46. Furthermore, the process data may contain information relating to a current state of the I/O units themselves, in particular diagnostic information and/or configuration information.

In one exemplary embodiment, the evaluation and control unit 14 generates a transmit data stream at cyclically recurring intervals which is forwarded via the data lines 26, 30, 32 from one I/O unit 18 to the next. Each I/O unit 18 reads allocated data from the received transmit data stream and writes current process data into the transmit data stream which is transmitted to the next I/O unit and finally to the evaluation and control unit 14. In this way, the evaluation and control unit 14 can gather the process data of all connected I/O units 18 and can communicate with the individual I/O units 18. In addition, a cross-communication between I/O units is in principle also possible if, for example, this is required for a fast local shutdown of the motor 48 in the event of the protective door 40 being opened.

In the preferred exemplary embodiments, in addition to the "internal" communication connection to the I/O units 18, the controller 10 also has an external communication connection, which is shown in simplified form in FIG. 1 by the double arrow 50. The external communication connection may be a fieldbus via which the head part 12 communicates with other units, for example with a different controller 52. The novel method is particularly well-suited to the cyclical communication of the evaluation and control unit 14 with the I/O units 18 in order to gather the process data of the I/O units 18 and to output further process data to the I/O units 18. However, the novel method can in principle also be used for an acyclical communication between the evaluation and control unit 14 and the I/O units 18 and/or for a cyclical or an acyclical communication via the external communication connection 50.

Figure 2:
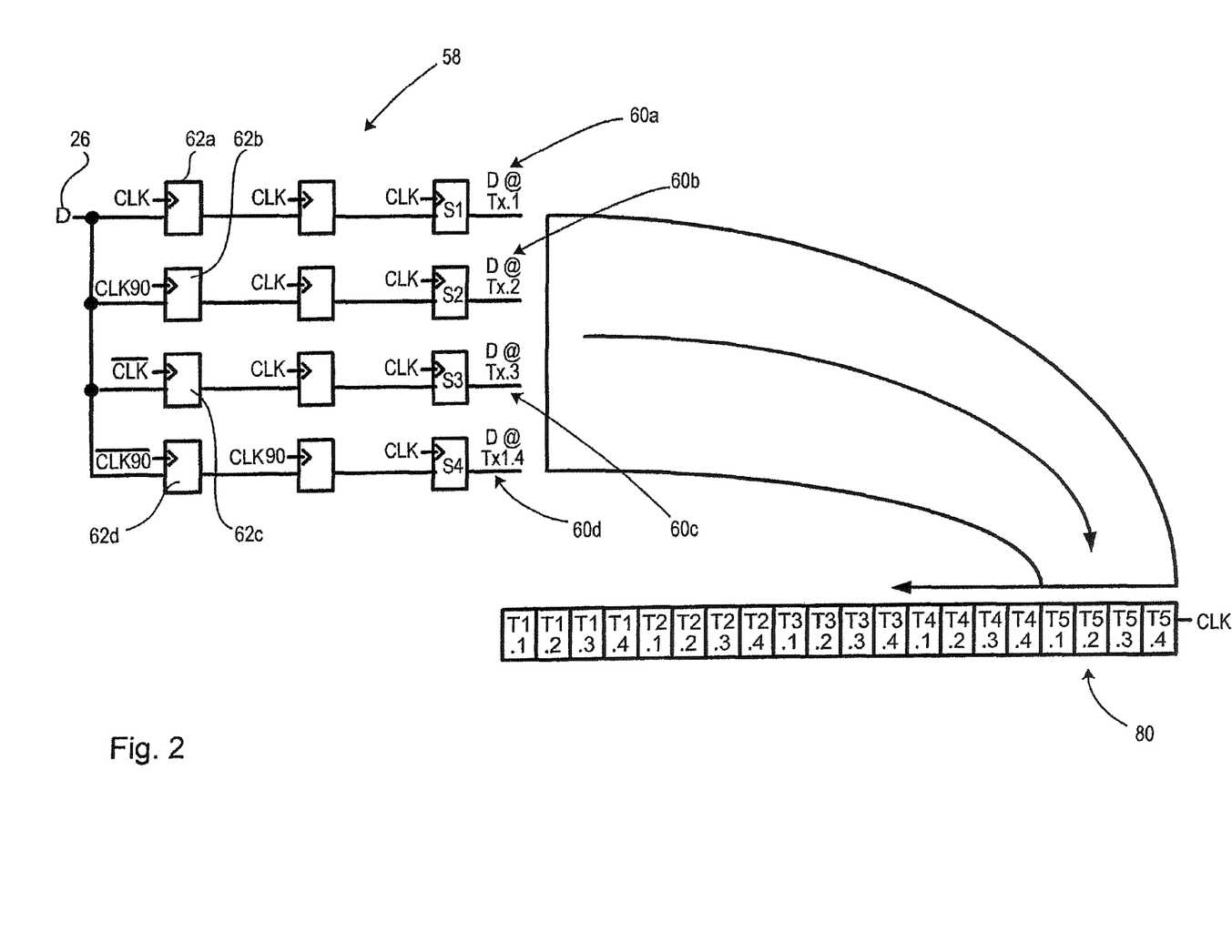
FIG. 2 shows an exemplary embodiment of the oversampling.

In FIG. 2, reference number 58 denotes a logic array which has four parallel data paths 60a, 60b, 60c and 60d. Each data path 60 has three flip-flops 62 which are connected in series. The respective first flip-flop 62a, 62b, 62c, 62d is connected to the transmit data stream which the communication module 22 receives via the input 26.

Figure 3:
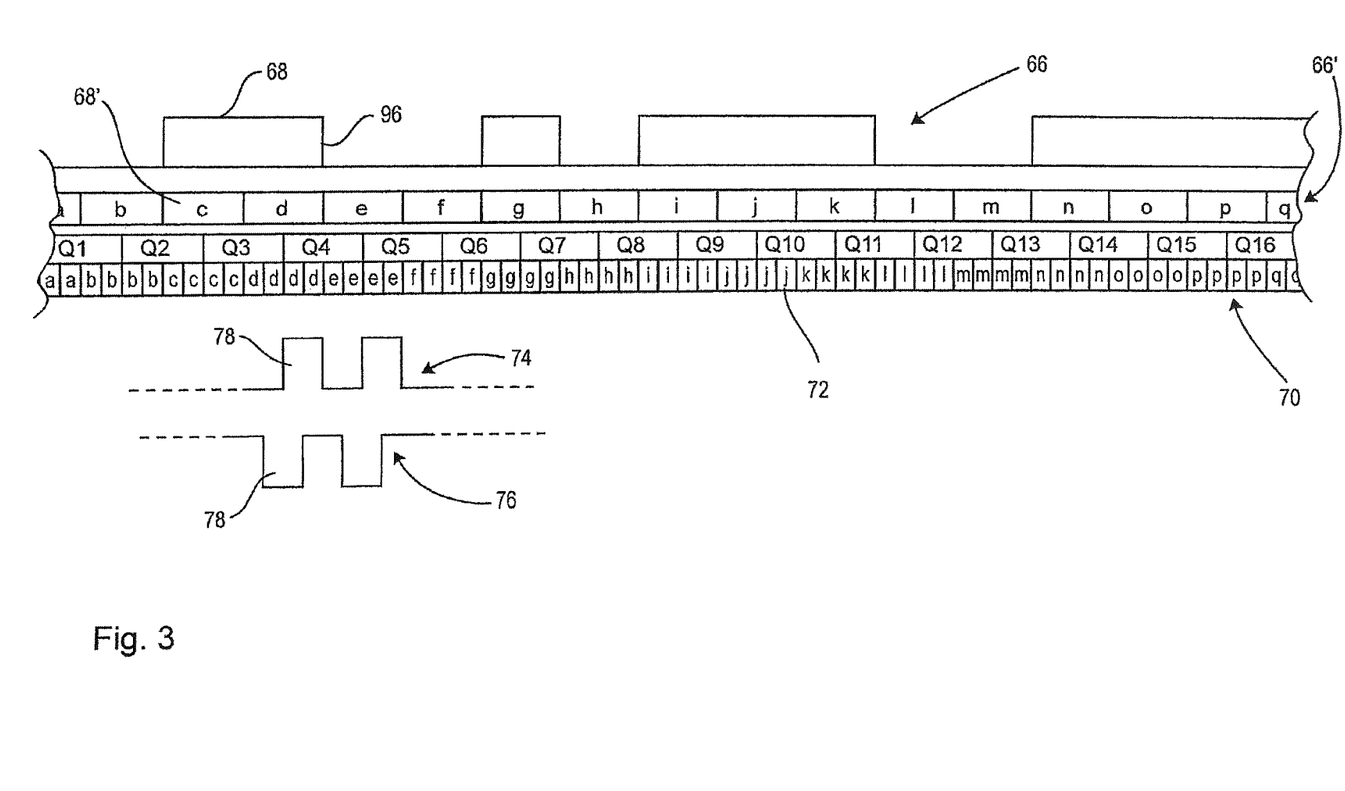
FIG. 3 shows a simplified representation to explain the relationships between the transmit data stream and the receiver data stream.

FIG. 3 shows the transmit data stream 66 in a schematic representation. The transmit data stream 66 consists of a plurality of serially consecutive data symbols 68. In preferred exemplary embodiments, the data symbols 68 are binary symbols which correspond either to a high or low voltage level on the data line. If a plurality of data symbols with a high voltage level follow one another, this produces a high voltage level over a plurality of data symbols. Nevertheless, the individual data symbols are distinguishable from one another, which is shown in FIG. 3 with the reference number 66 using the letters a, b, c, . . . .

A receiver data stream 70 containing a plurality of sampling values 72 is shown in FIG. 3 below the transmit data stream 66. In the exemplary embodiment shown, the receiver data stream 70 is produced from a quadruple oversampling of the transmit data stream 66. Four sampling values 72 having the logical value of the sampled data symbol accordingly exist for each data symbol 68.

In one preferred exemplary embodiment, the communication module 22 uses two clock signals 74, 76 which are phase-shifted by 90° in relation to one another. A sampling value 72 is generated from the transmit data stream 66 with each individual edge 78 of the two clock signals. In the practical implementation, the quadruple oversampling is effected by means of the logic array 58 in that the respective first flip-flops 62a-62d in each data path 60 respond to the four different edges of the two clock signals 74, 76. In the case shown, the flip-flop 62a in the first data path 60a assumes the level value of the data symbol present at the output 26 in the case of each positive edge 78 of the first clock signals 74. The first flip-flop 62b in the second data path 60b assumes the level value of the data symbol present at the output 26 in the case of each positive edge of the second clock signal 76. Since the two clock signals 74, 76 are phase-shifted by 90° in relation to one another, the two flip-flops 62a, 62b sample a data symbol present at the output 26 at different times. The flip-flop 62c in the third data path 60c assumes the level value of a data symbol present at the output 26 in the case of each falling edge of the first clock signal 74. The flip-flop 62d in the fourth data path 60d assumes the respective level value of a data symbol present at the output 26 in the case of each falling edge of the second clock signal 76. Overall, the four parallel flip-flops 62a to 62c therefore sample the transmit data stream present at the input 26 at four different consecutive instances of time. Since the clock frequency of the two clock signals 74, 76 in the preferred exemplary embodiment is roughly equal to the symbol rate of the transmit data stream 66, the flip-flops 62a to 62d supply four consecutive sampling values for each data symbol 68 of the transmit data stream 66. With the further flip-flops in each of the data paths 60a to 60d, the sampling values are synchronized with a common receiver system clock and are then written block-by-block into a shift register 80, which is shown symbolically in FIG. 2. Both the logic array 58 and the shift register 80 form part of the communication module 22.

Figure 4:
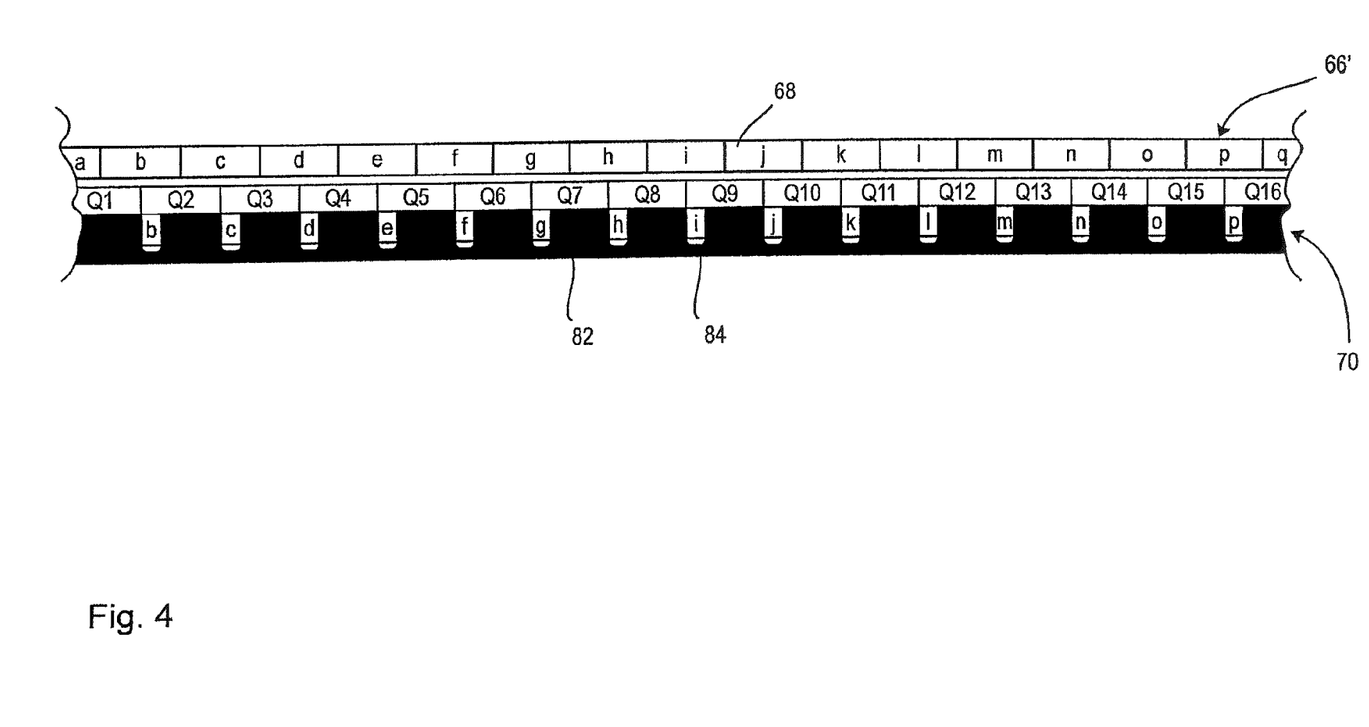
FIG. 4 shows the receiver data stream from FIG. 3 with a mask which symbolizes the selection of suitable sampling values.

In order to reconstruct the process data from the receiver data stream 70, it suffices to select a "suitable" sampling value in each case for each data symbol 68. A symbolic mask 82 with a plurality of mask openings 84 equidistant from one another can therefore be laid over the receiver data stream 70 and the respectively non-masked sampling values at the mask openings 84 can be selected, as shown in FIG. 4. However, it is not necessary to analyze the entire receiver data stream 70 "as a whole" for the selection of the sampling values 72. Instead, it suffices to analyze the receiver data stream 70 segment-by-segment and to select suitable sampling values 72 segment-by-segment or block-by-block. This is explained below with reference to FIG. 5.

Figure 5:
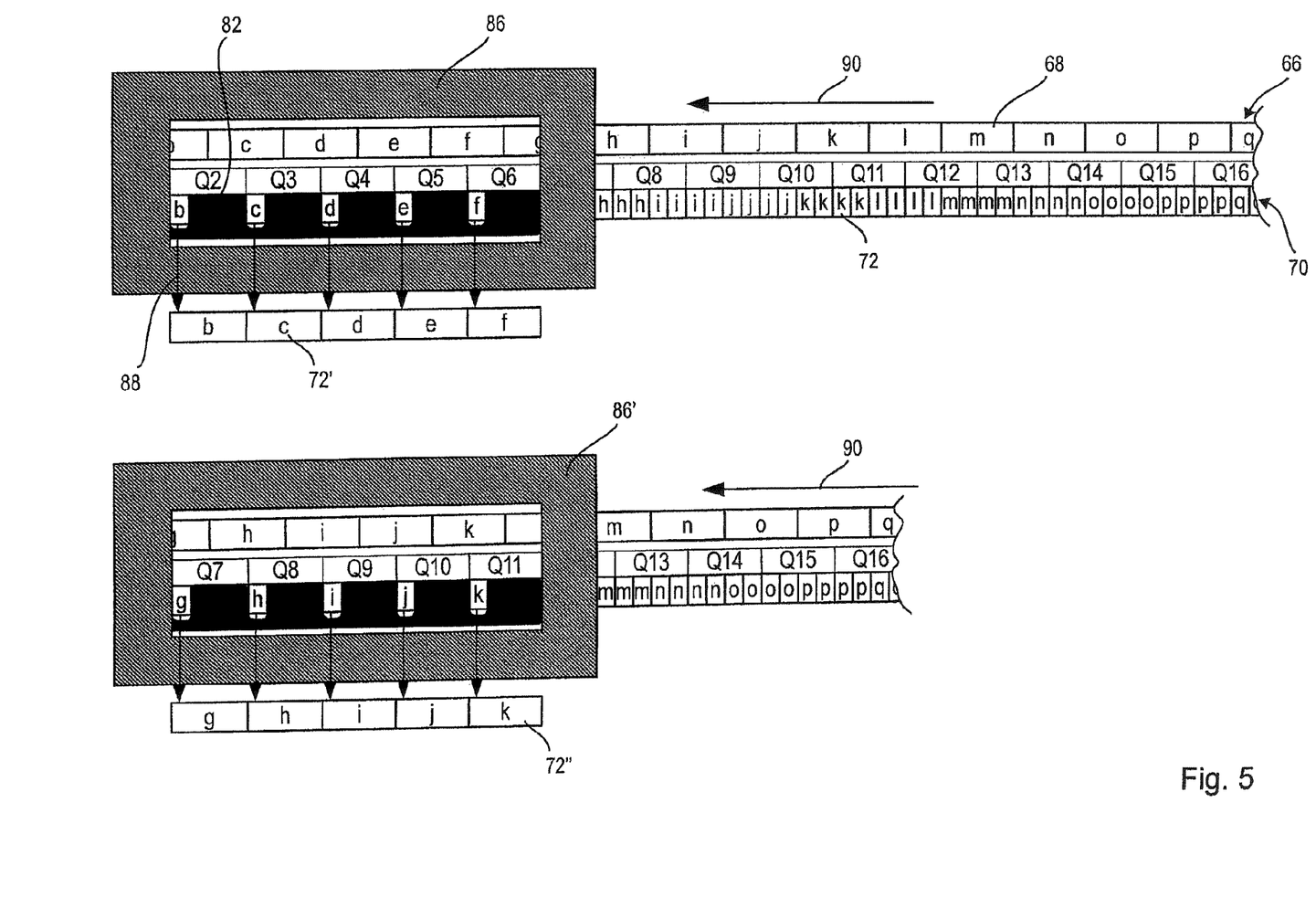
FIG. 5 shows the receiver data stream from FIGS. 3 and 4 together with two data packets with which the suitable sampling values are selected.

With reference number 86, FIG. 5 shows a window which, in the exemplary embodiment, in each case accommodates twenty sampling values 72. Due to the quadruple oversampling, this corresponds to five data symbols. It is not necessary for the window 86 to accommodate exactly five data symbols. Instead, it is permissible that the window 86 in each case "cuts off" the first and last data symbol, as shown in FIG. 5. Nevertheless, it is possible to select five sampling values 72' equidistant from one another block-by-block from the twenty sampling values in total, wherein each selected sampling value 72' corresponds to precisely one data symbol 68 of the transmit data stream 60.

In other words, the receiver data stream 70 is subdivided into data packets 86 by means of the window. A defined number of sampling values 72' is then selected from each data packet 86. The selected sampling values 72' are equidistant from one another, as shown by the symbolic mask 82 in FIG. 5. The selection of the sampling values 72' from the data packet 86 is effected in the preferred exemplary embodiments by means of data paths 88 parallel to one another which are connected to the serial shift register 80. In the preferred embodiment, the communication module 22 has five parallel data paths 88 which enable a simultaneous selection of five sampling values 72' per data packet 86 in each case. As soon as the five sampling values 72' have been simultaneously selected, a new data packet 86' is formed, and the next sampling values 72" are simultaneously selected. The formation of the data packets 86, 86' is implemented in the preferred exemplary embodiments by shifting the receiver data stream 70 with the plurality of sampling values 72 serially by means of the shift register 80, as shown with the arrow 90.

In summary, the communication module 22 therefore reconstructs a part of the received process data step-by-step or block-by-block in each I/O unit 18. The transmit data are first oversampled via a logic array with parallel data paths 60. The oversampled receiver data are written into a serial shift register 80 (cf. FIG. 2). The process data are reconstructed from the serial shift register by selecting one sampling value 72' per data symbol from the plurality of sampling values per data symbol in each case. The selection is made block-by-block in each case by evaluating a data packet 86 using parallel data paths 88. In the exemplary embodiments shown, the number N of sampling values 72 per data packet 86 is the product from the oversampling factor and the number of bits reconstructed in a processing step. At least three bits are preferably selected simultaneously and it is particularly preferable in each case to select five bits simultaneously, resulting in N=4×5=20 sampling values per data packet in the exemplary embodiment shown.

Figure 6:
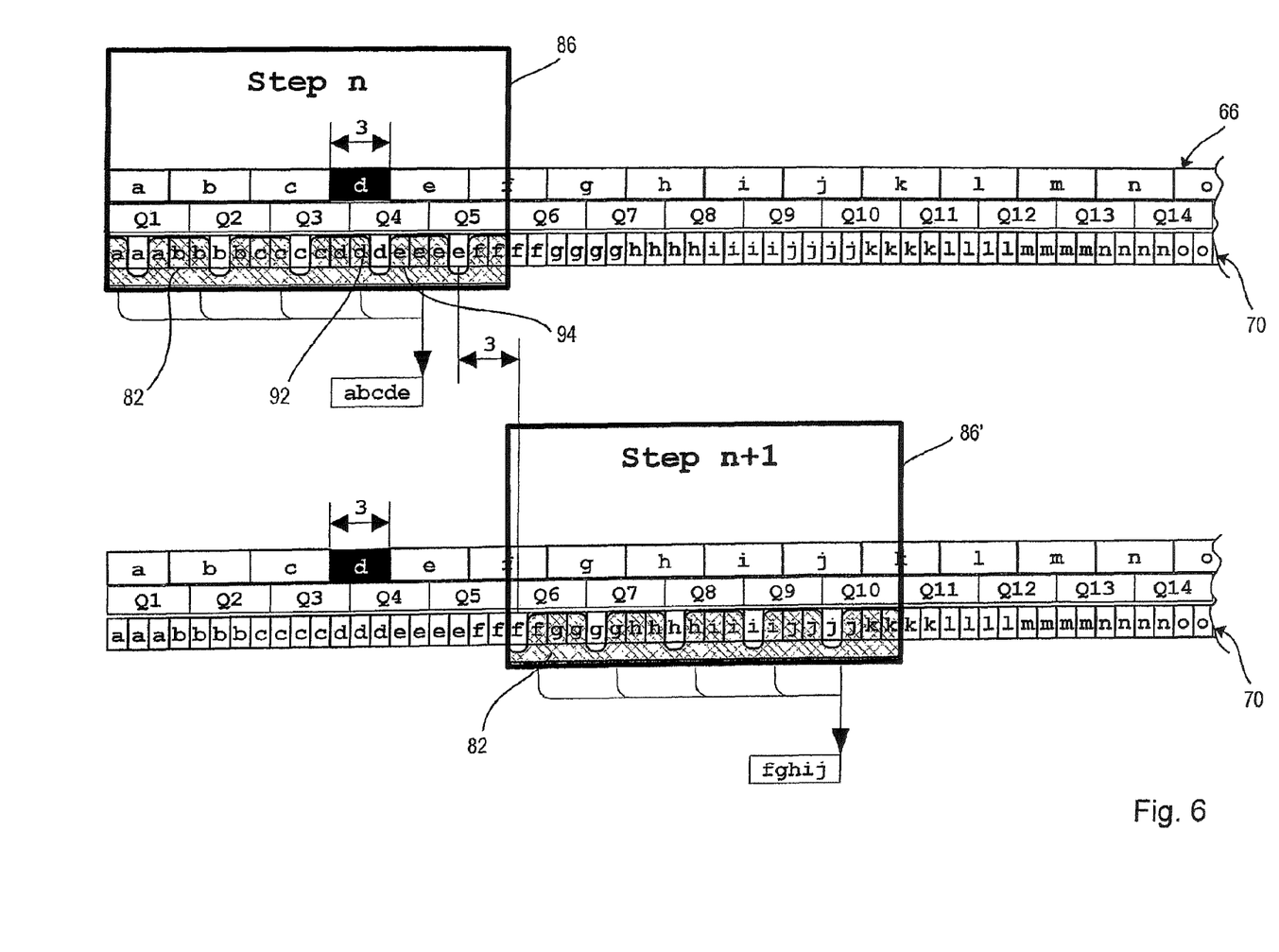
FIG. 6 shows the adaptation of the selection mask depending on a comparison between selected sampling values and their respective neighbors.

The equidistant distribution of the selected sampling values 72' 72" guarantees an error-free reconstruction of the process data, insofar as the selection mask 82 is in each case "correctly" positioned in relation to the data packets 86. In the preferred exemplary embodiment, the correct positioning of the selection mask 82 is verified by comparing the respectively selected sampling values 72', 72" with their respective neighboring sampling values 92, 94. This is shown in FIG. 6 by the example of the sampling value "d". The left-side neighbor 92 similarly represents the data symbol "d". The selected sampling value "d" and its left-side neighbor 92 are accordingly equal. Conversely, the selected sampling value "d" and its right-side neighbor 94 are not equal, since the neighboring sampling value 94 already represents the next data symbol "e". The selected sampling value "d" is located accordingly in the area of a signal edge 96 of the transmit data stream 66 (cf. FIG. 3), which is unfavorable in terms of an error-free reproduction of the process data. The selection mask 82 is therefore shifted by one sampling value to the left in the next data packet 86', so that the sampling values 72" then selected are located predominantly centrally in relation to the data symbols 86. This is shown symbolically in FIG. 6, and, as a result, the interval between the selected sampling value "e" and the selected sampling value "f" is less than the corresponding intervals between the selected sampling values in the first data packet 86.

Figure 7:
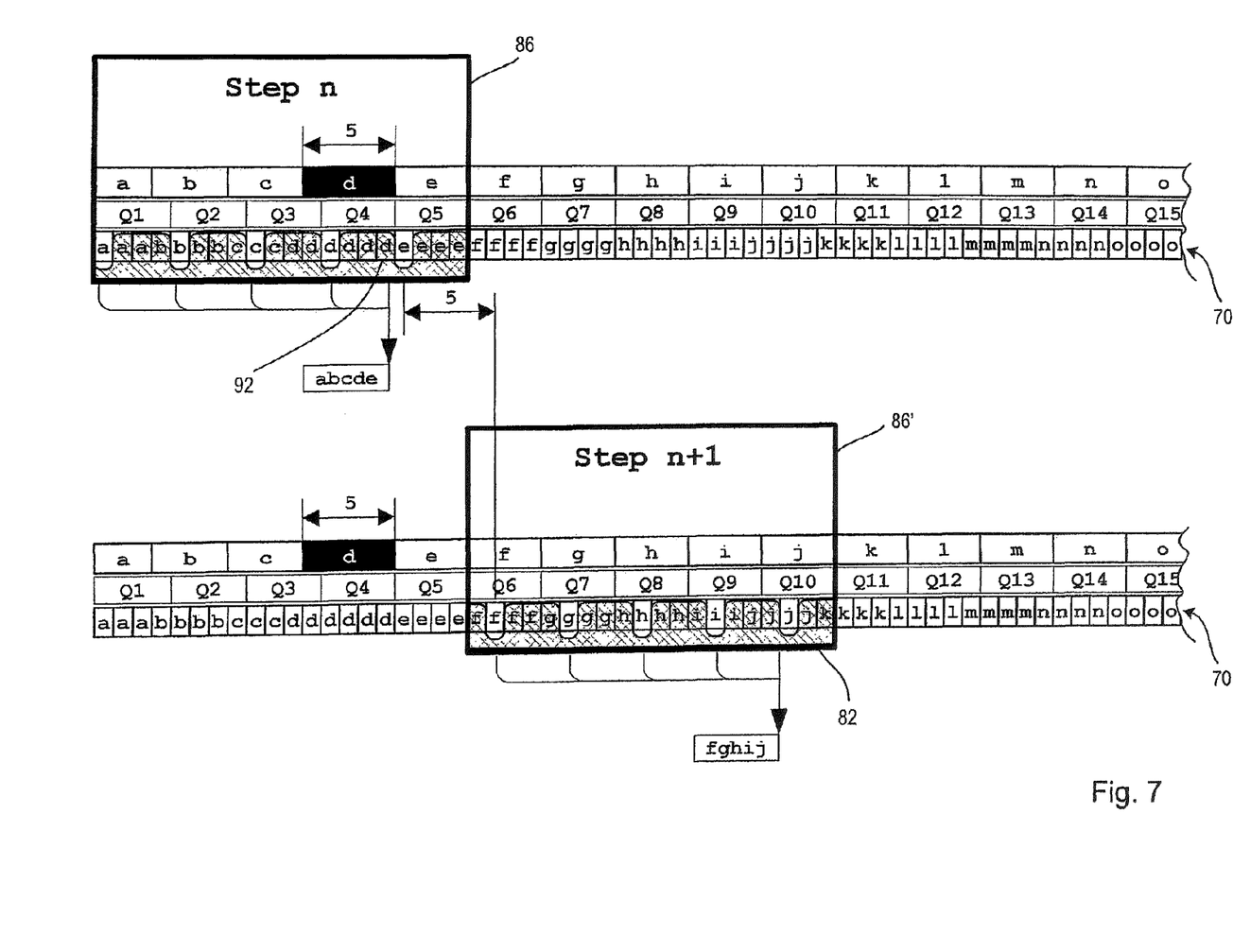
FIG. 7 shows a further example of the adaptation of the selection mask.

In the case shown, the signal edge 96 is located to the right of the selected sampling value "d" and the selection mask 82 is therefore shifted by one sampling value to the right. FIG. 7 shows the opposite situation, in which a selected sampling value "e" is not equal to its left-side neighbor 92. The selection mask 82 is therefore shifted by one sampling value to the right in the next data packet 86'. The relative interval between the selected sampling value "e" and the selected sampling value "f" is therefore 5 (non-selected) sampling values and is thus greater than the relative interval between the other selected sampling values.

Generally, the novel method therefore always shifts the selection mask 82 by one sampling value to the left or right if the comparison of a selected sampling value 72', 72" with its respective neighbors 92, 94 reveals a difference, wherein the mask 82 is in each case shifted away from the neighboring sampling value recognized as not equal.

Figure 8:
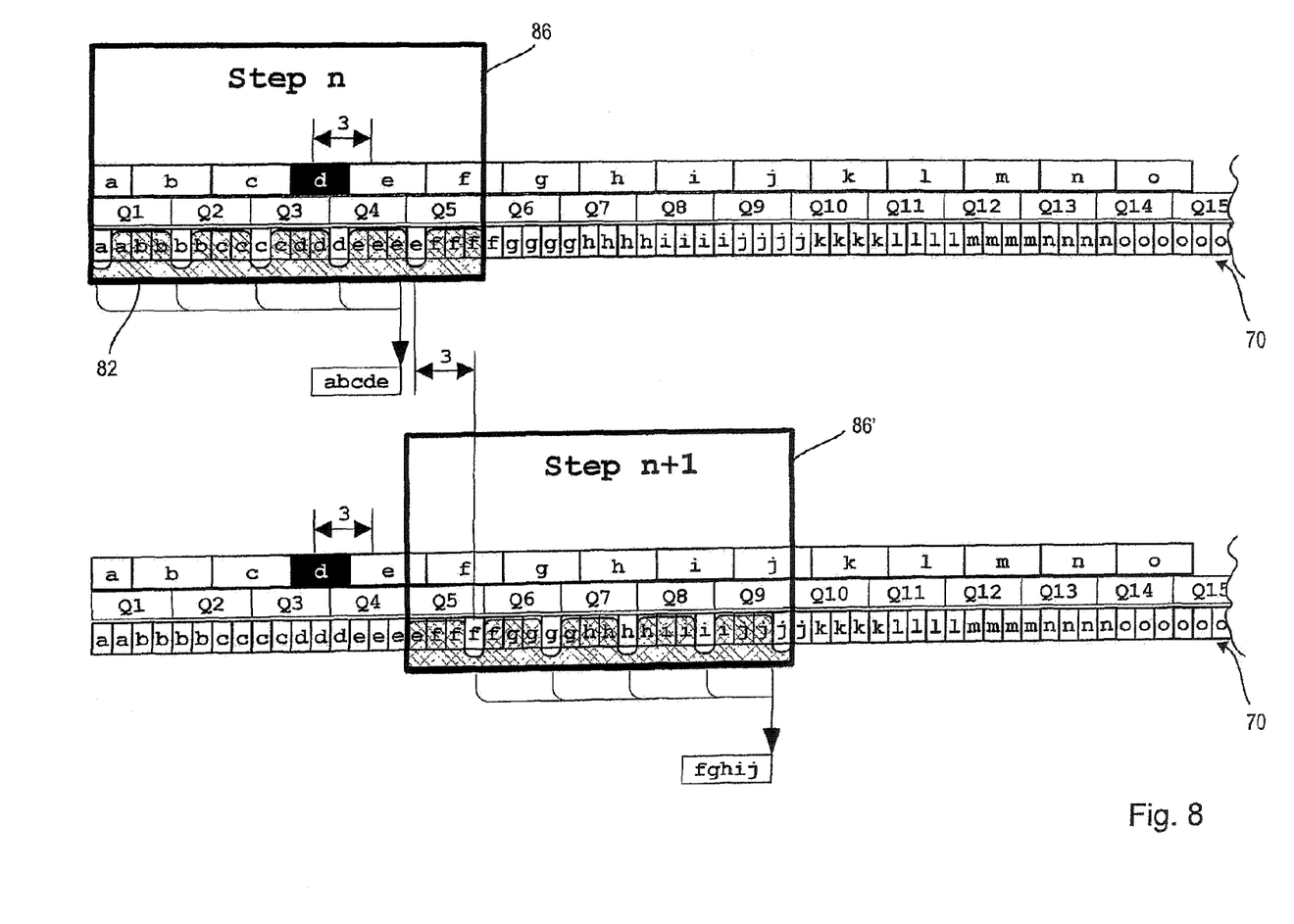
FIG. 8 shows a further example, wherein a second data packet is determined depending on the results of the comparison of the sampling values from a first data packet.

If the clock signals 74, 76 in the communication module 22 of the process data receiver lead or lag behind the corresponding transmit clock of the process data transmitter, it is possible that the selection mask 82 can no longer be shifted according to the rule described above after a plurality of cycles without a mask opening 84 dropping out of the window 86 or the data packet represented thereby. For example, it is not possible in the situation shown in FIG. 8 to shift the mask 82 in step n further to the left without the mask opening 84 dropping out for the selection of the sampling value "a". In such a case, the mask 82 is shifted in the preferred exemplary embodiment completely to the opposite edge of the window, as shown in FIG. 8 in step n+1. In this case, the data packet 86' is advantageously determined in such a way that the sampling values for the data symbol "f" are included, since the sampling value "f" for the corresponding data symbol would otherwise be lost. As shown in FIG. 8, the data packet 86' must therefore again include the last four sampling values from the data packet 86, i.e. the data packets 86, 86' partially overlap one another in relation to the included sampling values. Conversely, the data packet 86' will skip a number of sampling values if the selection mask 82 has been shifted completely in the opposite direction (not shown here). The subdivision of the receiver data stream 70 into the data packets 86, 86' therefore takes place accordingly depending on the results of the comparison between each selected sampling value and its right-side and left-side neighbor.

What is claimed is:

1. A method for transmitting process data in an automatically configured installation having a transmitter and a receiver, the method comprising the steps of:
   providing a process data transmitter which transmits respective current process data via a data line at defined recurring time intervals, and
   providing a process data receiver which receives the process data via the data line,
   wherein the process data transmitter transmits the process data via the data link in the form of a serial transmit data stream comprising a plurality of data symbols at a defined symbol rate,
   wherein the process data receiver samples the serial transmit data stream at a sampling rate which is higher than the symbol rate by a defined factor in order to thereby generate a serial receiver data stream comprising a plurality of sampling values per data symbol,
   wherein the process data receiver subdivides the serial receiver data stream into data packets, each of which has a defined first number of sampling values,
   wherein the process data receiver selects a defined second number of sampling values from the respective data packets,
   wherein the second number is smaller than the first number by the defined factor,
   wherein the sampling values selected from each data packet are equidistant from one another,
   wherein the process data receiver processes the selected sampling values as received process data, and
   wherein each selected sampling value has a right-side and a left-side neighbor, and wherein the process data receiver compares the selected sampling values with respective right-side and left-side neighbors in order to determine a plurality of comparison results.

2. The method of claim 1, wherein the process data receiver selects the defined second number of sampling values simultaneously from the respective data packets.

3. The method of claim 1, wherein the process data receiver forms the data packets in temporally consecutive steps.

4. The method of claim 1, wherein the process data receiver forms the data packets depending on the comparison results.

5. The method of claim 1, wherein the process data receiver selects the second number of sampling values depending on the comparison results.

6. The method of claim 5, wherein the process data receiver selects first equidistant sampling values from a first data packet, and selects second equidistant sampling values from a second data packet, wherein the first and second sampling values are distributed equidistantly if the first sampling values and respective right-side and left-side neighbors are equal in each case.

7. The method of claim 6, wherein the second sampling values are shifted in relation to the first sampling values if at least one first sampling value is not equal to its right-side or left side neighbor.

8. The method of claim 1, wherein the process data transmitter transmits the current process data with a line code which is designed in such a way that at least one symbol change occurs in each data packet.

9. The method of claim 1, wherein the process data transmitter transmits the current process data with a 4B5B line code.

10. The method of claim 1, wherein the factor is at least equal to four.

11. The method of claim 1, wherein the factor is exactly equal to four.

12. The method of claim 1, wherein the second number is equal five.

13. The method of claim 1, wherein the process data receiver generates a first clock signal having first clock signal edges and a second clock signal having second clock signal edges, the first and second clock signals being phase-shifted by 90°, and wherein the process data receiver samples the transmit data stream with each first and second clock signal edge.

14. The method of claim 13, wherein the first and second clock signals each have a clock frequency which corresponds to the defined symbol rate.

15. The method of claim 1, wherein the process data receiver comprises a logic array having a plurality of data paths parallel to one another, wherein the parallel data paths operate at a clock frequency which corresponds to the defined symbol rate.

16. The method of claim 1, wherein the process data receiver modifies process data from the serial data stream in order to generate an updated transmit data stream, and wherein the process data receiver transmits the updated transmit data stream via a further data line.

17. In an automatically controlled installation in which a process data transmitter transmits respective current process data at defined recurring time intervals via a data line, wherein the process data transmitter transmits the process data via the data line in the form of a serial transmit data stream which has a plurality of data symbols at a defined symbol rate, a process data receiver for receiving the process data, comprising:

an input for receiving the serial transmit data stream, a communication module which extracts the process data from the serial transmit data stream, and an output, wherein the communication module samples the serial transmit data stream at a sampling rate which is higher than the symbol rate by a defined factor in order to thereby generate a serial receiver data stream with a plurality of sampling values per data symbol, wherein the communication module subdivides the serial receiver data stream into data packets, each of which has a defined first number of sampling values, wherein the communication module selects a defined second number of sampling values from the respective data packets, wherein the second number is less than the first number by the defined factor, wherein the sampling values selected from each data packet are equidistant from one another, and wherein the communication module makes the selected sampling values available at the output wherein each selected sampling value has a right-side and a left-side neighbor, and wherein the process data receiver compares the selected sampling values with respective right-side and left-side neighbors in order to determine a plurality of comparison results.

* * * * *